United States Patent [19]

Peloquin

[11] Patent Number: 5,550,791

[45] Date of Patent: Aug. 27, 1996

[54] COMPOSITE HYDROPHONE ARRAY ASSEMBLY AND SHADING

[75] Inventor: Mark S. Peloquin, Uncasville, Conn.

[73] Assignee: The United States of America as represented by the Secretary of the Navy, Washington, D.C.

[21] Appl. No.: 520,971

[22] Filed: Aug. 2, 1995

[51] Int. Cl.$^6$ .................................................. H04R 17/00
[52] U.S. Cl. ........................ 367/153; 367/154; 367/159; 310/800
[58] Field of Search .................................. 367/153, 159, 367/154; 310/800

[56] References Cited

U.S. PATENT DOCUMENTS

| | | | |
|---|---|---|---|
| 4,486,869 | 12/1984 | Carter | 367/154 |
| 4,809,244 | 2/1989 | Penneck et al. | 367/162 |
| 4,810,913 | 3/1989 | Beauducel et al. | 310/337 |

Primary Examiner—J. Woodrow Eldred
Attorney, Agent, or Firm—Michael J. McGowan; James M. Kasischke; Prithvi C. Lall

[57] ABSTRACT

A composite hydrophone array assembly is made from a compliant mandrel such as a hollow tube and at least one wrap of piezoelectric film adhered to the compliant hollow tube at a plurality of locations thereon. Each location defines a composite hydrophone channel. The centers of adjacent hydrophone channels are separated along the length of the compliant hollow tube. To shade a hydrophone channel, the wall thickness of the hollow tube can be varied along its length, the circumferential area of coverage of the wraps of piezoelectric film can be varied along their length, the longitudinal lengths of the wraps of piezoelectric film are varied, or a combination of these approaches can be used. Unwanted noise is rejected by eliminating hydrophone channel grating lobes and overlapping portions of the wraps of piezoelectric film of the adjacent hydrophone channels to create a wavenumber response for the composite hydrophone array that significantly reduces array grating lobes.

23 Claims, 5 Drawing Sheets

5,550,791

COMPOSITE HYDROPHONE ARRAY ASSEMBLY AND SHADING

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention P The present invention relates generally to acoustic arrays, and more particularly to a composite hydrophone array assembly having a hydrophone channel response that can be shaded along its length.

(2) Description of the Prior Art

Traditionally, ceramic hydrophones are used in towed arrays for the purpose of measuring pressure fields in a fluid. Discrete (i.e., separated) hydrophone elements are grouped together to form what is commonly known as a hydrophone group or channel as it will be referred to hereinafter. The hydrophone elements are connected together electrically in parallel or series or a combination of both. The hydrophone channel is connected to the input of a preamplifier. Each preamplifier is connected to the input of a telemetry channel. The array output is comprised of a number of distinct hydrophones whose signals are time delayed and summed so that the array is steered in many directions to search the volume of the liquid for incident acoustic waves.

In the traditional array construction with ceramic hydrophones, a hydrophone channel is centered within a foam cylinder for positioning within a hose. The associated electronics are mounted in a similar fashion and the hose is filled with a nonconductive fluid such as silicone oil. Strength members needed to sustain the drag loads developed during towing are either molded into the hose wall or exist as cords within the oil and foam inner volume of the confines of the hose.

The array is spatially shaded at a beamformer by weighting numerically, usually in software, the outputs of each hydrophone channel. The purpose of shading is to reduce the level of the side lobes of the array response thereby increasing the ability of the array to discriminate between signals of interest. The array response can be discussed either as a function of bearing relative to its longitudinal axis or as a function of wavenumber as will be used hereinafter to describe the hydrophone channel or array response.

In the traditional hydrophone array, the hydrophone channel is not shaded because of the difficulty involved. The amplitude and/or phase of the discrete hydrophone elements have to be individually adjusted to achieve a particular variation in sensitivity as a function of length. This is a very costly process and is usually not undertaken. A problem that results from the traditional uniformly weighted hydrophone channel design is that the first side lobe of the hydrophone is only 13 dB down from the main lobe with successive side lobes rolling off at 6 dB per octave. These hydrophone channel side lobe levels can admit unwanted noise due to flow or structural vibration. A second problem with the traditional hydrophone channel design is that there exist hydrophone channel grating lobes set by the physical spacing of the hydrophone elements. These hydrophone channel grating lobes admit unwanted noise from the sources previously described for the hydrophone channel side lobes.

Skinner, U.S. Pat. No. 4,672,592, provides a cylindrical transducer for use as a low frequency hydrophone using a thin-walled cylinder made up of transducer material. Electrodes are positioned on the external and internal surfaces of the transducer material. One electrode of the transducer is deposited in a pattern wherein the electrode coverage varies as a function of transducer axial length. Capacitance variations between the inner and outer surfaces are used to detect acoustic signals; accordingly, great care must be take when manufacturing the transducer to insure that close tolerances are maintained between the two electrodes.

Pearce, U.S. Pat. No. 5,357,486, provides a piezoelectric film strip transducer wherein the film is wrapped around a flexible, inert mandrel a number of times. Standoff collars or bosses are provided on each end of the piezoelectric film strip section to separate an outer coating from the film. Variations in pressure in the region between the film strip and the outer coating cause the film strip to flex in tension thereby generating a voltage.

SUMMARY OF THE INVENTION

Accordingly, it is an object of the present invention to provide a hydrophone array assembly of reduced structural complexity.

Another object of the present invention is to provide a hydrophone array assembly that lends itself to spatial shading thereof.

Other objects and advantages of the present invention will become more obvious hereinafter in the specification and drawings.

In accordance with the present invention, a composite hydrophone array assembly is made from a compliant mandrel such as a hollow tube and at least one wrap of piezoelectric film adhered to the compliant hollow tube at a plurality of locations thereon. Each location defines a composite hydrophone channel. The centers of adjacent hydrophone channels are separated along the length of the compliant hollow tube. To shade a hydrophone channel, the wall thickness of the hollow tube can be varied along its length, portions of the wraps of piezoelectric film of the adjacent hydrophone channels can overlap one another in an area of overlap, or a combination of these two approaches can be used. Regardless of the approach taken, alignment (in the wavenumber domain) of the hydrophone nulls with grating lobes of the composite hydrophone array assembly is maintained.

BRIEF DESCRIPTION OF THE DRAWING(S)

Other objects, features and advantages of the present invention will become apparent upon reference to the following description of the preferred embodiments and to the drawings, wherein.

Figure 6:
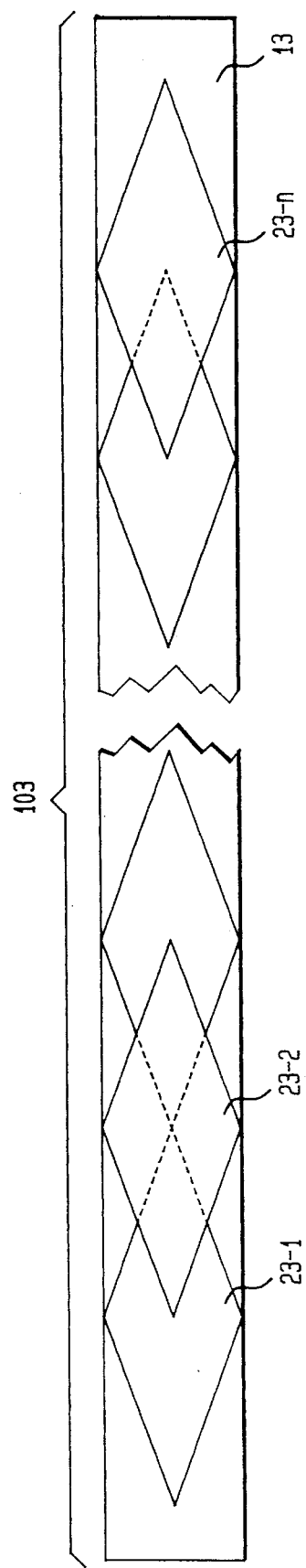
Figure 7:
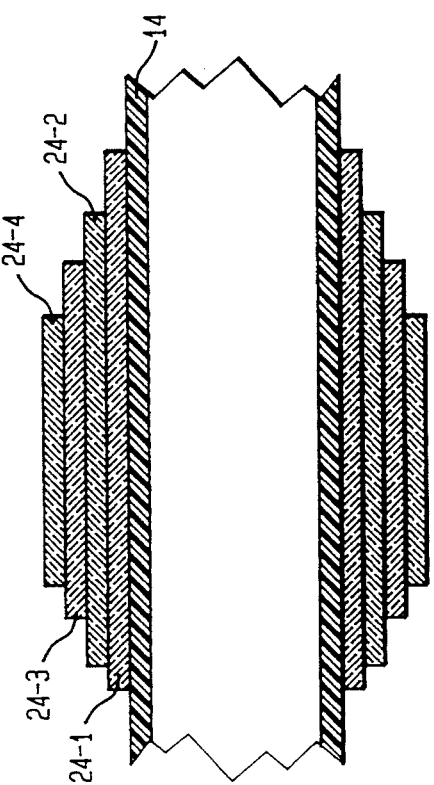

FIG. 6 is a flat projection view of another embodiment of the present invention in which the surface area of the piezoelectric film is varied along the length of the assembly's tube in order to achieve spatial shading along the length of the hydrophone channels; and FIG. 7 is a cross-sectional view of a multi-layered composite hydrophone channel consisting of concentric wraps of piezoelectric film where each successive wrap is reduced in surface area in order to achieve spatial shading.

DESCRIPTION OF THE PREFERRED EMBODIMENT(S)

Figure 1:
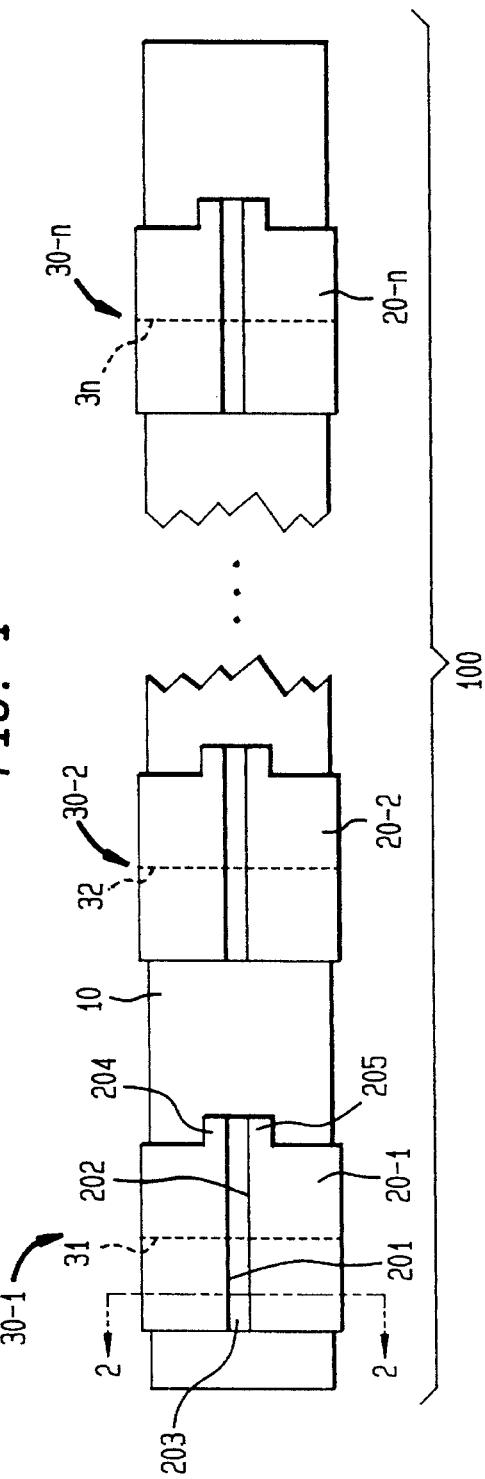
FIG. 1 is a side view of an embodiment of the composite hydrophone array assembly according to the present invention.

Referring now to the drawings, and more particularly to FIG. 1, one embodiment of the composite hydrophone array assembly is shown and referenced generally by numeral 100. Assembly 100 consists of a compliant form or mandrel 10 running the entire length of assembly 100, and wraps 20-1, 20-2, . . . , 20-n of piezoelectric film in contact with mandrel 10. Mandrel 10 forms the strength member of assembly 10 for sustaining the drag load on assembly 100 when being towed in a fluid. Further, the combination of mandrel 10 with each of wraps 20-1, 20-2, . . . , 20-n forms corresponding composite hydrophone channels 30-1, 30-2, . . . , 30-n having acoustic centers indicated respectively at 31, 32, . . . , 3n. Thus, each hydrophone channel 30-1, 30-2, . . . , 30-n is one extended hydrophone sensor. This attribute eliminates hydrophone channel grating lobes thereby eliminating the noise associated with traditional hydrophone channel design. Additionally, since one "element" now comprises a channel, it is now a tractable task to spatially shade the extended hydrophone sensor as will be explained further below. Henceforth, in the context of the present invention, the term hydrophone channel will refer to the extended sensor constructed without gaps in the longitudinal direction.

Briefly, when assembly 100 is exposed to a pressure field, mandrel 10 undergoes circumferential strain and wraps 20-1, 20-2, . . . , 20-n sense the strain at their respective locations in assembly 100. Structural waves traveling in compliant mandrel 10 can be detected in the same manner as the pressure fields. Endpoint vibration of mandrel 10 or distributed shear can excite extensional and bending waves in mandrel 10. Direct measurement of the strain fields are made by means of wraps 20-1, 20-2, . . . , 20-n. For a proper response, the stiffness (e.g., defined by Young's modulus) of mandrel 10 must be equal to or greater than the stiffness of the piezoelectric film used for wraps 20-1, 20-2, . . . , 20-n.

Figure 2:
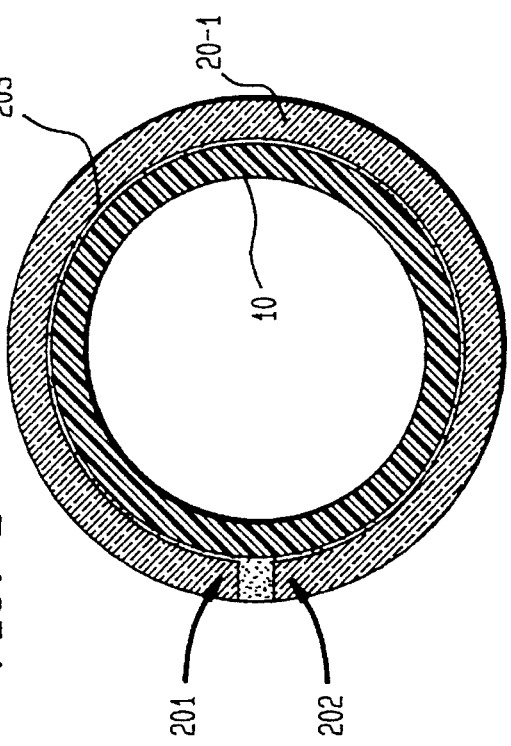
FIG. 2 is a cross-sectional view of one composite hydrophone element taken along line 2—2 of FIG. 1.

Compliancy in the present invention refers to compressibility in the radial direction. In order to achieve the necessary radial compression with respect to an incoming pressure field, mandrel 10 is typically a hollow tube (as it will be referred to hereinafter) as best seen in the cross-sectional view of FIG. 2. Suitable materials for tube 10 include any compliant, non-conductive material such as a plastic. Such commercially available plastics include the homopolymer of chlorotrifluoroethylene (CTFE) manufactured by The 3M Company under the trademark KEL-F, and polycarbonate available from General Electric under the trademark LEXAN.

For purpose of illustration, it will be assumed that mandrel or tube 10 is cylindrical. This is generally the case for towed array assemblies in order to minimize drag. However, other tube geometries (e.g., square, triangular, etc.) are possible for stationary array assemblies. Tube 10 is typically air-filled. However, tube 10 could also be filled with another radially compressible material that is at least ten times more compressible than the composite hydrophone channels 30-1, 30-2, . . . , 30-n.

Each of wraps 20-1, 20-2, . . . , 20-n is generally constructed in the same fashion so that each composite hydrophone channels 30-1, 30-2, . . . , 30-n exhibits the same electrical properties. In this way, the response properties are uniform for each hydrophone channel. Accordingly, it will be sufficient herein to describe just wrap 20-1 with simultaneous reference to FIGS. 1 and 2. As mentioned above, wrap 20-1 is a piezoelectric film such as poly vinylidene fluoride (PVDF), which is available commercially from a variety of sources. The piezoelectric film is a thin-film on the order of 9–110 micrometers thick. Wrap 20-1 represents a single full wrap of piezoelectric film, or a laminate of electrically connected layers as will be described further below.

In its simplest form, wrap 20-1 is a single wrap of piezoelectric film glued (using glue 203) over its entire area of contact with the circumference of tube 10. Wrap 20-1 is glued over its entire area of contact for several reasons. First, the glue creates an integral structure that will survive the rigors of handling, i.e., reeling, deployment, retrieval and the bending associated with these operations. Secondly, the rigors of handling and differences in thermal expansion coefficients for tube 10 and wrap 20-1 could create a pucker or bump in the wrap. The pucker or bump acts as a local spot of high sensitivity thereby negating the goal of maintaining uniform hydrophone sensitivity. Edges 201 and 202 of wrap 20-1 can butt up against one another as shown, overlap slightly, or continue around the circumference of tube 10 multiple times. Glue 203 is an electrically non-conductive glue such as URALITE 3140 manufactured by Hexcel Corporation. Edges 201 and 202 further have tabs 204 and 205, respectively, extending therefrom for purpose of providing pads for connection to electrical leads (not shown).

Assembly 100, as described above and shown in FIGS. 1 and 2, is constructed so that each channel element 30-1, 30-2, . . . , 30-n is of uniform sensitivity as a function of its length in the longitudinal or axial direction of assembly 100. However, the composite hydrophone array of the present invention can also be constructed so that its sensitivity is tailored or shaded (as it is known) to be a function of length. Shading in the present invention can be accomplished in a variety of manners. Accordingly, several illustrative embodiments of shaded array assemblies in accordance with the present invention will be presented herein. However, it will be understood by one of ordinary skill in the art that the principles of these embodiments can be combined or altered without departing from the scope of these teachings. For ease of illustration, electrical connection pads associated with the composite hydrophone elements in FIGS. 3 and 5–7 have been omitted.

Figure 3:
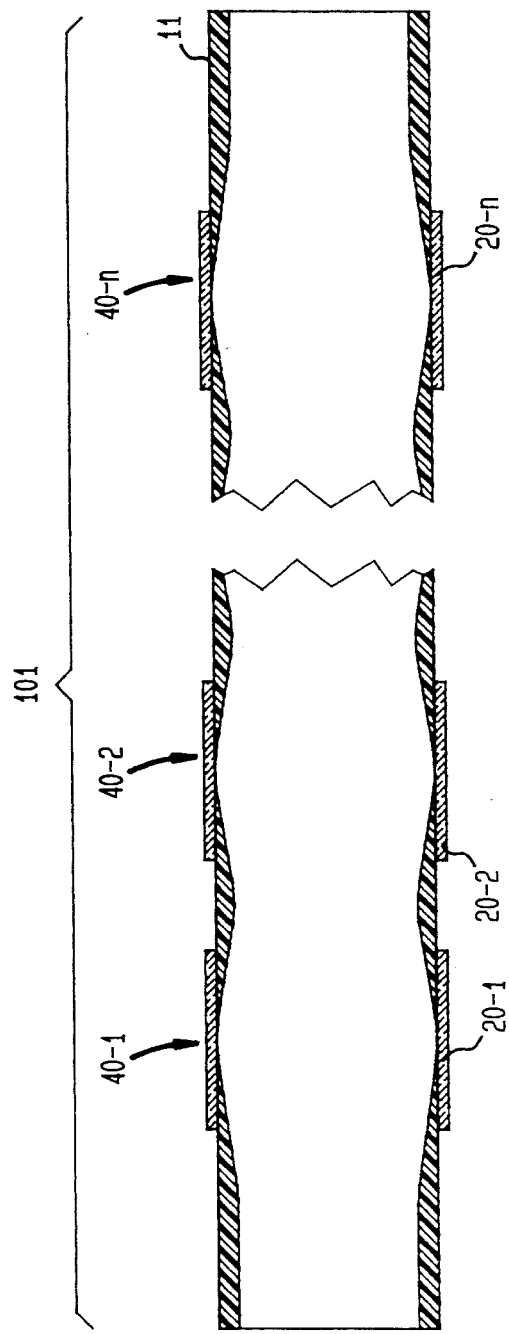
FIG. 3 is a length-wise cross-sectional view of a shaded composite hydrophone array assembly utilizing a variable inside diameter of the assembly's hollow tube for shading of the array.

FIG. 3 depicts, in length-wise cross-section, one embodiment of a shaded composite hydrophone array assembly in accordance with the present invention. Assembly 101 is identical to assembly 100 in FIGS. 1 and 2 except that the wall thickness of tube 11 in assembly 101 varies along its length at each of wraps 20-1, 20-2, . . . , 20-n. In other words, the inside diameter of tube 11 varies with its length at the location of each wrap 20-1, 20-2, . . . , 20-n. Thus, each resulting composite hydrophone channel 40-1, 40-2, . . . , 40-n has a sensitivity that varies with the length of the hydrophone. Each channel's sensitivity is a maximum at the channel's center and decreases linearly towards the edges of the channel in what is known as triangular shading. Note that the shaping of the inside of tube 11 can be other than what is shown in FIG. 3.

In any design that uses uniformly weighted hydrophones whose length equals the hydrophone channel spacing, the nulls of the hydrophones are aligned with the array grating lobes in wavenumber for the broadside steer direction. This is a desirable condition in which only the energy admitted by the main lobe of the array is at unity level. All unity level grating lobes are reduced by alignment with the hydrophone nulls in wavenumber space.

Shading the sensitivity of the hydrophone along its longitudinal length increases the width of the main lobe of the hydrophone and places the hydrophone nulls at wavenumbers greater than those of the uniformly weighted case. Thus, the hydrophone nulls no longer cancel out the array grating lobes so that unwanted high wavenumber energy is added to the array output. To correct this problem, the length of the shaded hydrophone can be increased beyond the hydrophone spacing distance requiring the hydrophones to be overlapped. Doing so causes the hydrophone nulls to cancel out the array grating lobes. The amount of overlap required to obtain alignment of the hydrophone nulls and array grating lobes, when the array is steered to the broadside direction, depends on the shading profile selected.

Figure 4A:
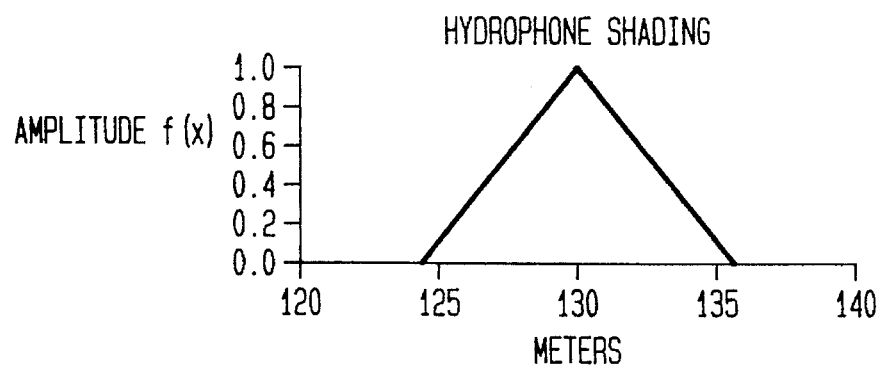
FIG. 4A is a graph depicting a triangular shading profile for one overlapped hydrophone channel.

FIGS. 4A–4F show the relationship in general between the shading profile, hydrophone spacing and the resulting wavenumber response. FIG. 4A shows a triangular shading profile for one hydrophone channel that has its associated piezoelectric film wrap(s) overlapped with wrap(s) associated with adjacent hydrophone channels. The shading profile of FIG. 4A transforms to the wavenumber domain shown in FIG. 4B by spatially Fourier transforming the sensitivity distribution shown in FIG. 4A according to the equation $$f(k) = \frac{1}{\sqrt{2\pi}} \int_{-\infty}^{\infty} f(x) e^{ikx} dx \tag{1}$$

Figure 4B:
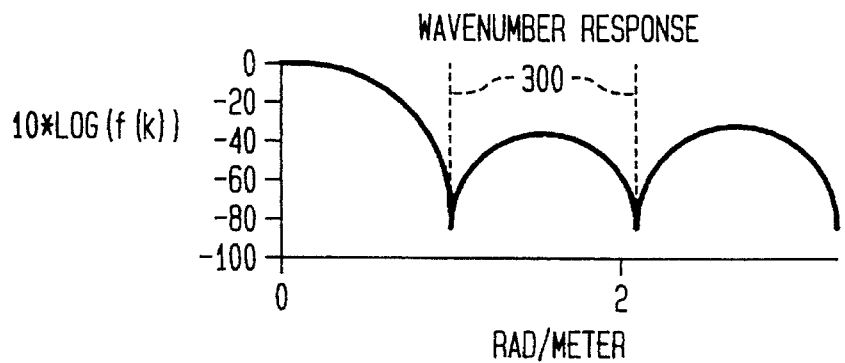
FIG. 4B is a graph depicting the spatial Fourier transform of the longitudinal hydrophone sensitivity variation (shading profile) of FIG. 4A to the wavenumber domain.
Figure 4C:
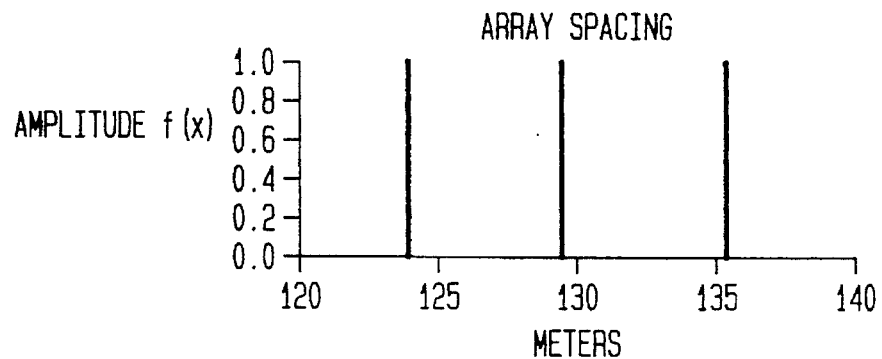
FIG. 4C is a graph depicting the spacing between centers of a three channel array made from overlapping hydrophone channels.
Figure 4D:
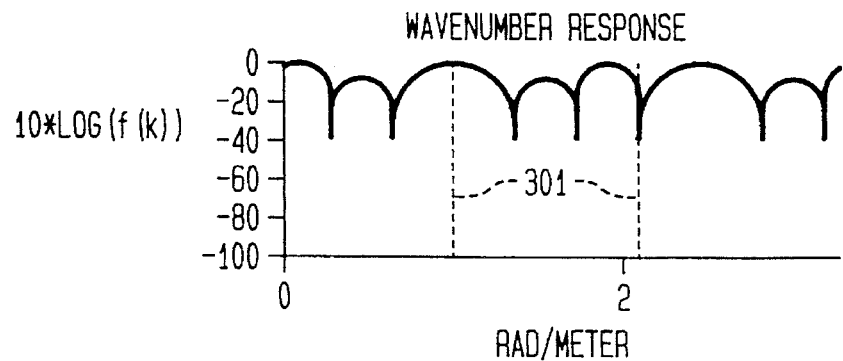
FIG. 4D is a graph depicting the array grating lobes in the wavenumber domain for the spacing in FIG. 4C.
Figure 4E:
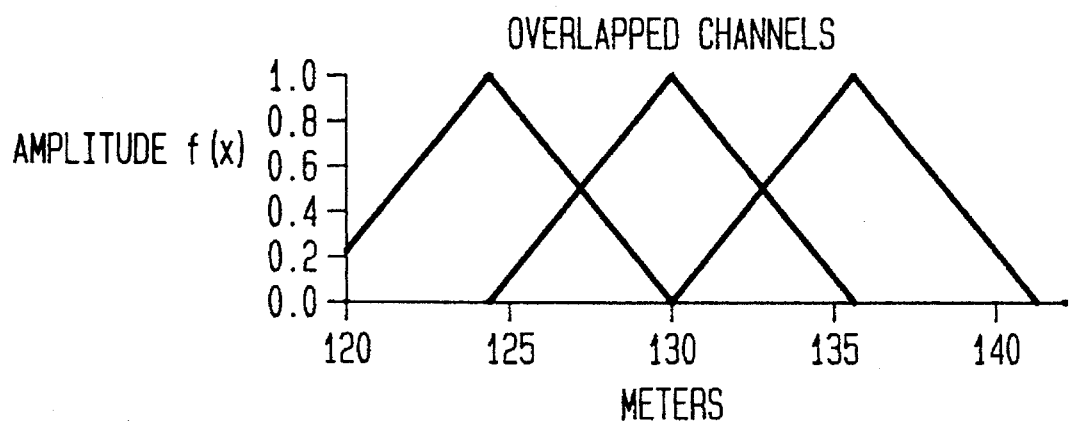
FIG. 4E is a graph depicting a triangular shading profile for three overlapped hydrophone channels.
Figure 4F:
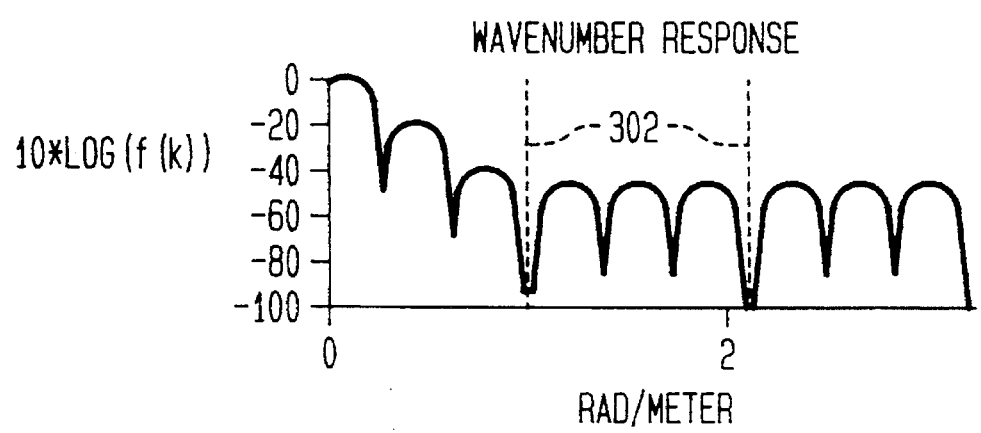
FIG. 4F is a graph depicting the wavenumber domain transformation of the shading profile of FIG. 4E showing the alignment of the hydrophone nulls with the array grating lobes.

The hydrophone nulls are indicated by vertical dashed lines 300 in FIG. 4B. In like manner, FIG. 4D is the spatial Fourier transform of the hydrophone spacing of a three channel array shown in FIG. 4C. Vertical dashed lines 301 indicate the array grating lobes. The sensitivity of the array of shaded hydrophones is shown in FIG. 4E while the spatial fourier transform of FIG. 4E, i.e., FIG. 4F, is formed by adding the Fourier transforms of the two previous cases, i.e., FIGS. 4B and 4D. Vertical dashed lines 302 show the hydrophone nulls aligned with the array grating lobes.

Figure 5:
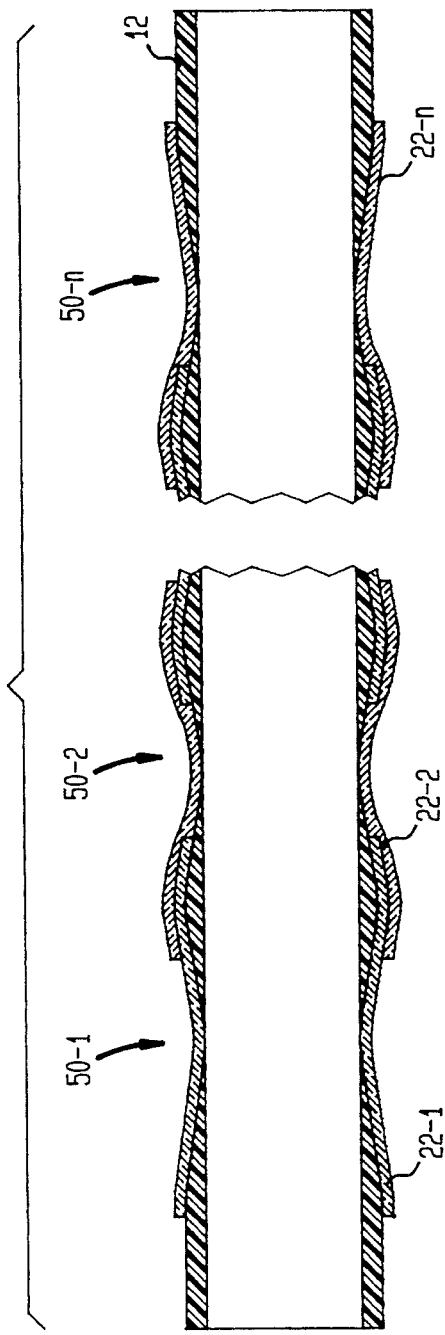
FIG. 5 is a length-wise cross-sectional view of another embodiment of the composite hydrophone assembly in which portions of the piezoelectric film of adjacent hydrophone elements overlap one another and in which a variable outside diameter of the assembly's hollow tube is used in conjunction with the overlapping portions of the piezoelectric film to shade the hydrophone channels of the array.

Specific embodiments of showing different ways of achieving hydrophone overlap will now be described by way of example with reference to FIGS. 5–7. FIG. 5 depicts, in length-wise cross-section, one embodiment of a shaded composite hydrophone array assembly utilizing overlapping hydrophone channels. In this embodiment, assembly 102 has wraps 22-1, 22-2, . . . , 22-n that partially overlap adjacent wraps. Proper shading of composite hydrophone channels 50-1, 50-2, . . . , 50-n causes alignment of the hydrophone nulls with the array grating lobes. On way of accomplishing this is to vary the wall thickness of tube 12. In this embodiment, the outside diameter of tube 12 varies with its length at the location of each wrap 22-1, 22-2, . . . , 22-n. (Note that the inside diameter of tube 12 could alternatively be varied as in the embodiment shown in FIG. 3.) The shaping of the outside of tube 12 can be other than what is shown in FIG. 5.

In the above examples, the surface area of the wraps of piezoelectric film as a function of longitudinal length was held constant. However, shading of the composite hydrophone array assembly of the present invention can also be accomplished by maintaining a constant wall thickness of the compliant mandrel or tube and varying the surface area of the wraps of the piezoelectric film as a function of wrap's length. This approach is depicted in FIG. 6 where assembly 103 is shown as a flat projection view. That is, tube 13 (of constant wall thickness) is projected flat in the plane of FIG. 6. Wraps 23-1, 23-2, . . . , 23-n are also projected flat in the plane of FIG. 6 and utilize a surface area (e.g., diamond-shaped) that varies with the length thereof. Note that the present invention could further be extended to utilize a combination of variable wall thickness of the tube and variable surface area of the piezoelectric film wraps to align the hydrophone nulls and array grating lobes in the wavenumber domain or to tailor the hydrophone side lobe levels.

Yet another approach to shading in the present invention can be accomplished by constructing multi-layered composite hydrophone channels such as the one shown in cross-section in FIG. 7. More specifically, tube 14 (of constant wall thickness as shown or variable wall thickness) is wrapped with concentric wraps 24-1, 24-2, 24-3 and 24-4 of piezoelectric film. Wrap 24-1 is glued (for example, using the afore-described glue such as URALITE 3140 from Hexcel Corporation) to tube 14 and successive wraps are glued to the previous wrap. The glue has been omitted from this drawing for clarity of illustration. Wraps 24-1, 24-2, 24-3 and 24-4 vary in surface area to achieve a spatially shaded response. The individual wraps can be contiguous with one another or formed as discrete wraps. In this embodiment, through holes (not shown) are typically provided in the wraps so that they can be connected electrically in a series or parallel combination.

The advantages of the present invention are numerous. The composite hydrophone and mechanical structure for the array are integrated into a single assembly. Spatial shading of the hydrophone channel can be accomplished in a variety of fashions by merely adjusting the tube, the piezoelectric film, or both. Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A composite hydrophone array assembly, comprising:

a compliant mandrel; and a plurality of pieces of piezoelectric film wrapped about and adhered to said compliant mandrel at a plurality of locations on said compliant mandrel for defining a corresponding plurality of composite hydrophone channels, wherein centers of adjacent ones of said plurality of composite hydrophone channels are separated along the length of said compliant mandrel.

2. A composite hydrophone array assembly as in claim 1 wherein, for said adjacent ones of said plurality of composite hydrophone channels, portions of said plurality of pieces of piezoelectric film overlap.

3. A composite hydrophone array assembly as in claim 1 wherein said compliant mandrel is a hollow tube.

4. A composite hydrophone array assembly as in claim 3 wherein said hollow tube is air-filled.

5. A composite hydrophone array assembly as in claim 3 wherein said hollow tube is at least as stiff as each of said plurality of pieces of piezoelectric film.

6. A composite hydrophone array assembly as in claim 3 wherein the wall thickness of said hollow tube varies along the length of said hollow tube.

7. A composite hydrophone array assembly as in claim 1 wherein surface area of each of said plurality of pieces of piezoelectric film varies along the length of said compliant mandrel for each of said plurality of composite hydrophone channels.

8. A composite hydrophone array assembly as in claim 1 wherein each of said plurality of pieces of piezoelectric film comprises a plurality of concentric wraps of piezoelectric film to include a first wrap of piezoelectric film adhered to said compliant mandrel and at least one additional wrap of piezoelectric film concentric with and adhered to said first wrap of piezoelectric film.

9. A composite hydrophone array assembly as in claim 8 wherein each of said plurality of concentric wraps varies in surface area.

10. A composite hydrophone array assembly as in claim 8 wherein said plurality of concentric wraps are electrically connected to one another in serial fashion.

11. A composite hydrophone array assembly as in claim 8 wherein said plurality of concentric wraps are electrically connected to one another in parallel fashion.

12. A composite hydrophone array assembly as in claim 1 wherein said compliant mandrel is cylindrical.

13. A composite hydrophone array assembly, comprising:

a compliant hollow tube;

at least one wrap of piezoelectric film adhered to said compliant hollow tube at a plurality of locations on said compliant hollow tube for defining a corresponding plurality of composite hydrophone channels, wherein centers of adjacent ones of said plurality of composite hydrophone channels are separated along the length of said compliant hollow tube; and portions of said at least one wrap of piezoelectric film of said adjacent ones of said plurality of composite hydrophone channels overlapping one another in an area of overlap to maintain frequency domain alignment of hydrophone nulls and grating lobes of said adjacent ones of said plurality of composite hydrophone channels.

14. A composite hydrophone array assembly as in claim 13 wherein said compliant hollow tube is air-filled.

15. A composite hydrophone array assembly as in claim 14 wherein said hollow tube is at least as stiff as said piezoelectric film.

16. A composite hydrophone array assembly as in claim 16 wherein the wall thickness of said compliant hollow tube varies along the length of said compliant hollow tube.

17. A composite hydrophone array assembly as in claim 13 wherein surface area of said at least one wrap of piezoelectric film varies along the length of said compliant hollow tube for each of said plurality of composite hydrophone channels.

18. A composite hydrophone array assembly as in claim 13 wherein said at least one wrap of piezoelectric film comprises a plurality of concentric wraps of piezoelectric film to include a first wrap of piezoelectric film in contact with said compliant hollow tube and at least one additional wrap of piezoelectric film concentric with and adhered to said first wrap of piezoelectric film.

19. A composite hydrophone array assembly as in claim 18 wherein each of said plurality of concentric wraps varies in surface area.

20. A composite hydrophone array assembly as in claim 18 wherein said plurality of concentric wraps are electrically connected to one another in serial fashion.

21. A composite hydrophone array assembly as in claim 18 wherein said plurality of concentric wraps are electrically connected to one another in parallel fashion.

22. A composite hydrophone array assembly as in claim 13 wherein said compliant hollow tube is cylindrical.

23. A composite hydrophone array assembly as in claim 13 wherein said compliant hollow tube is filled with a material that is at least ten times more compressible in a radial direction as each of said plurality of composite hydrophone channels.

* * * * *